United States Patent [19]

Benninger et al.

[11] 4,343,621

[45] Aug. 10, 1982

[54] PROCESS FOR THE PRODUCTION OF AQUEOUS SOLUTIONS OF SODIUM CHLORIDE FROM ROCK SALT

[75] Inventors: Siegfried Benninger, Schwalbach; Karl Reining, Kelkheim; Werner Krasel, Hofheim am Taunus, all of Fed. Rep. of Germany

[73] Assignee: Hoechst Aktiengesellschaft, Frankfurt am Main, Fed. Rep. of Germany

[21] Appl. No.: 240,317

[22] Filed: Mar. 4, 1981

[30] Foreign Application Priority Data

Mar. 6, 1980 [DE] Fed. Rep. of Germany ....... 3008563

[51] Int. Cl.$^3$ .............................................. B01J 8/02
[52] U.S. Cl. ................................ 23/293 R; 210/433.1; 210/540; 210/779; 422/261; 423/179; 423/499
[58] Field of Search ..................... 422/261, 264, 267; 23/293 R; 423/179, 499; 210/268, 433.1, 540, 779; 261/5, 6

[56] References Cited

U.S. PATENT DOCUMENTS

| | | | |
|---|---|---|---|
| 2,551,494 | 5/1951 | Kaufmann | 422/264 |
| 2,552,524 | 5/1951 | Cunningham | 422/267 X |
| 2,603,534 | 7/1952 | Miller | 422/264 X |
| 2,630,377 | 3/1953 | Lewis | 422/267 |
| 3,047,276 | 7/1962 | Sebald et al. | 261/6 X |
| 3,130,016 | 4/1964 | Grier | 423/179 |
| 3,363,995 | 1/1968 | Driskell et al. | 423/179 |
| 3,623,848 | 11/1971 | Fisher et al. | 423/499 X |
| 3,800,026 | 3/1974 | Morgan | 423/179 |
| 4,116,640 | 9/1978 | Leverenz | 422/264 B |

FOREIGN PATENT DOCUMENTS

2643341 9/1976 Fed. Rep. of Germany .

*Primary Examiner*—Richard L. Chiesa
*Attorney, Agent, or Firm*—Curtis, Morris & Safford

[57] ABSTRACT

The invention relates to an open dissolving chamber for rock salt and to a process for the production, free from vapors, of concentrated, aqueous sodium chloride crude brine by continuously dissolving rock salt in this dissolving chamber. The dissolving chamber contains a heap of rock salt with which the brine which is unsaturated in respect of salt comes into contact. The brine thereby becomes saturated with sodium chloride and then passes out of the dissolving chamber. In the present process, the unsaturated brine enters at the base of the dissolving chamber. The saturated crude brine is removed from the rock salt through at least one vertical or inclined screen which largely holds back suspended rock salt particles. The liquid level of the saturated crude brine in the dissolving chamber should not reach the surface of the heap of rock salt, and the side of the screen facing the interior of the dissolving chamber should be completely covered with a mixture of saturated crude brine and rock salt.

3 Claims, 9 Drawing Figures

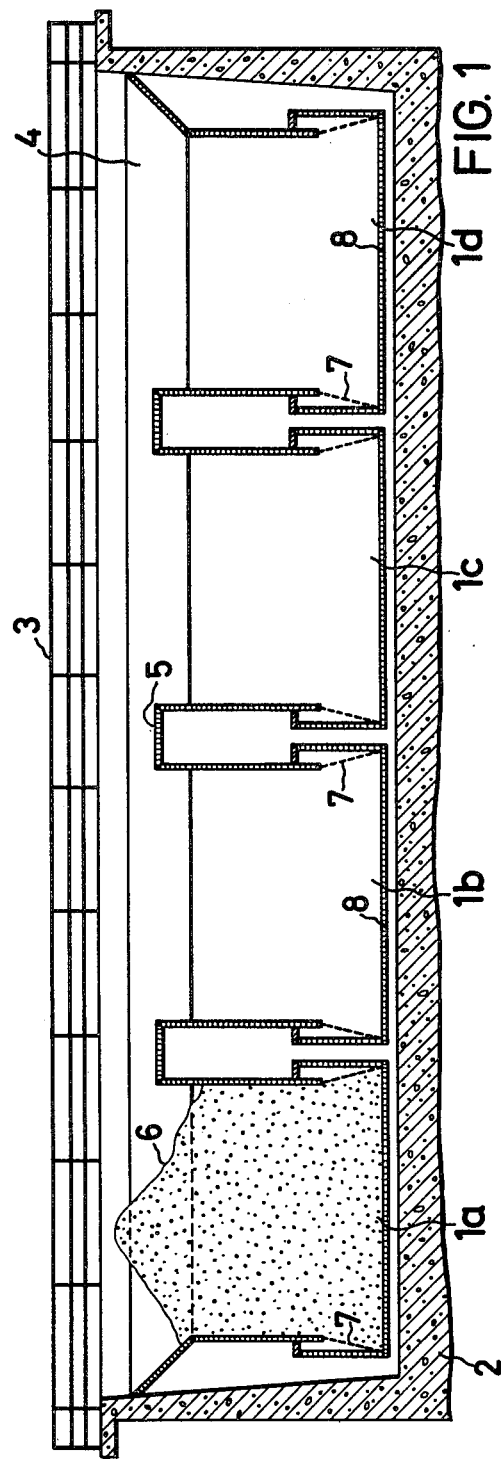
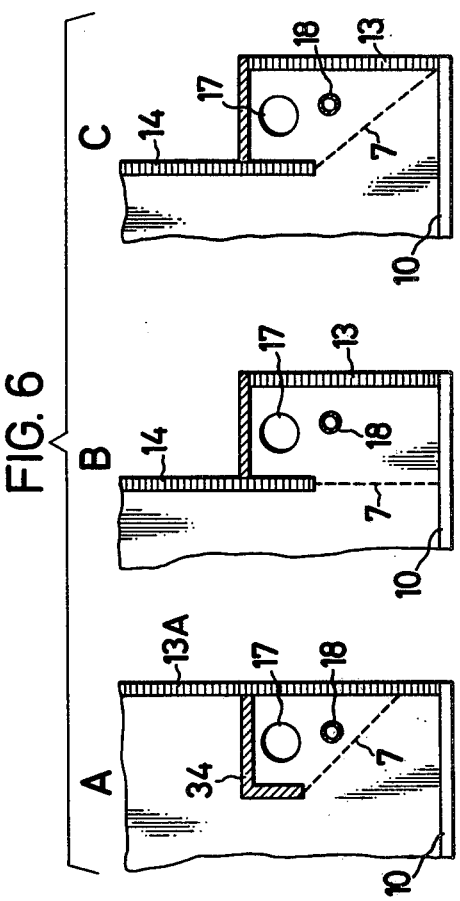
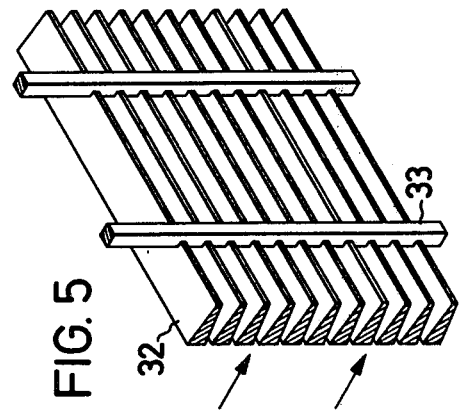

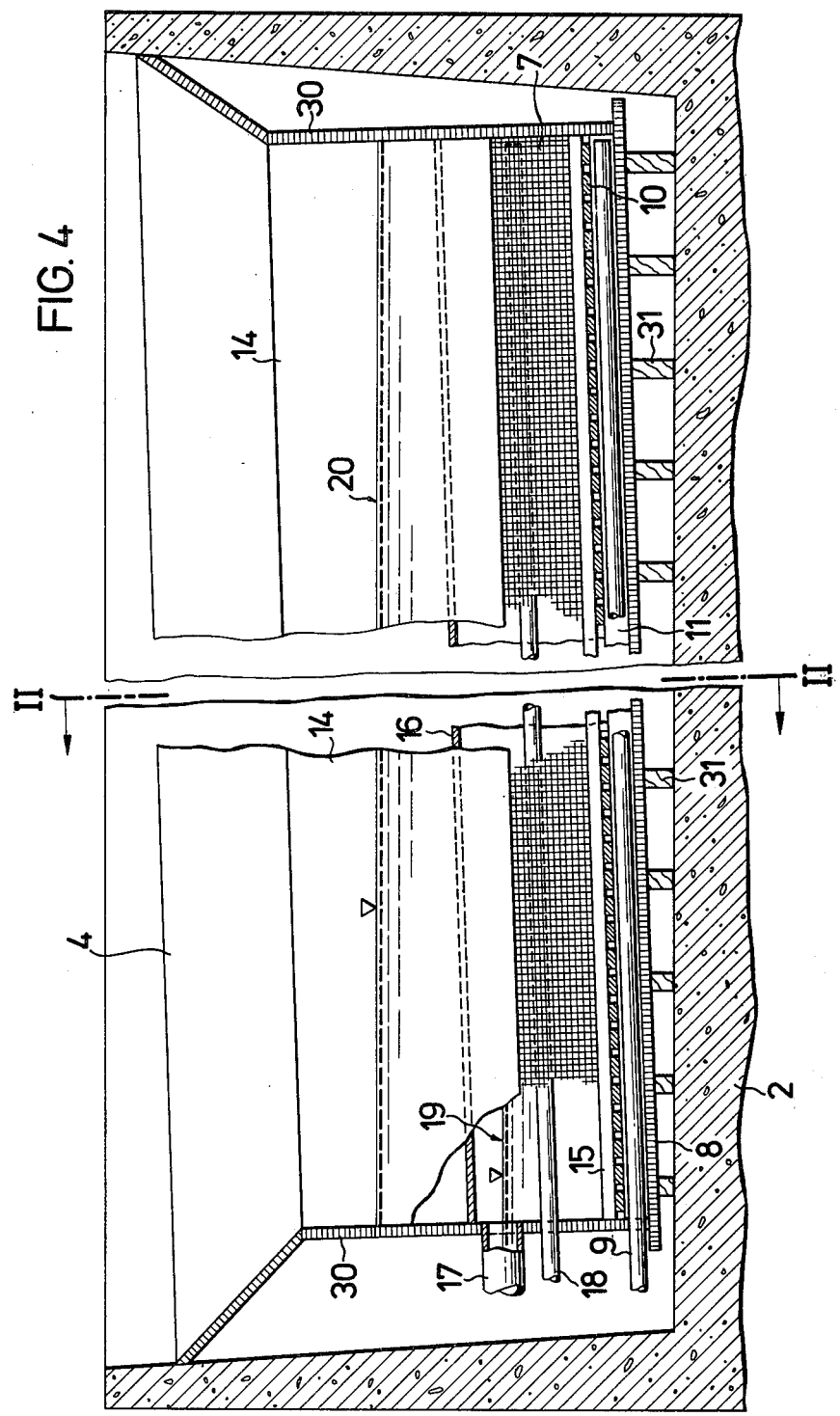

PROCESS FOR THE PRODUCTION OF AQUEOUS SOLUTIONS OF SODIUM CHLORIDE FROM ROCK SALT

The present invention relates to a continuous process for dissolving rock salt by means of water or dilute brine in a dissolving chamber with the formation of concentrated sodium chloride solution.

For the electrolysis of sodium chloride on an industrial scale for the production of chlorine and sodium hydroxide solution, it is necessary to dissolve large quantities of salt continuously. This process is nowadays carried out almost exclusively using a closed circulation of brine, that is to say the salt consumed in the electrolysis cells is replaced by resaturating the dilute brine with solid salt.

If soluble evaporated salt, free from residues, or sea salt is employed, rapid dissolvers as they are called are generally preferred as dissolving equipment. Solid salt is metered continuously from above into these vessels, which in most cases taper off downwards in the shape of a cone. The dilute brine, which is introduced into the cone or at the base flows through the heap of salt from below and is taken off as saturated "crude brine" at an overflow point.

Other designs of raid dissolver have been disclosed for dissolving rock salt, which, by virtue of its content of gangue and/or anhydrite, does not dissolve without leaving a residue (German Pat. No. 2,643,341 and U. S. Pat. Nos. 3,130,016, 3,623,848 and 2,551,494). However, these rapid dissolvers have not been able to gain general acceptance in industry. This is due to technical difficulties caused by the considerable abrasion of material at the gangue discharge and to the high incidence of repair work caused thereby.

In chloralkali electrolysis the problem is to remove the losses of electrical energy in the form of excess heat from the brine circulation and to keep the water balance of the brine circulation in equilibrium. Particularly when electrolysis is carried out with mercury cells, it is necessary in most cases to discharge water. In endeavoring to prevent the emission of effluents containing mercury, these effluents are passed to the brine circulation as far as possible, so that the total water inflow exceeds the consumption of water occurring in the process.

Removal of water is mostly effected by open evaporation of hot brine. In this respect, particularly when rock salt is employed, the most widely-used solution is to combine evaporative cooling, the dissolving process and the salt stock in the same place. In practice, dilute brine is sprayed on the salt heap in the containers or basins used for storage, and solution takes place to some extent at this stage. The necessary evaporation of water can be achieved very easily by suitable control of the spraying process. The salt can be flushed out easily in the form of mash from the salt store proper by means of a brine jet and can be dissolved completely in brine channels and/or tanks situated downstream. The deposition of the gangue in the store can also be prevented in this way; this gangue is frequently held back in special gangue separators of a variety of designs, which are placed downstream of the dissolving unit.

Compared with rapid dissolvers, this process has the additional advantages that the construction of dry, roofed stores and the additional conveying expense for continuous metered addition from the store to the dissolving tank become unnecessary.

However, recent investigations have shown that the vapors formed in this open evaporation of dilute brine contain a corrosive salt spray and that, in addition, traces of mercury are present if dilute brine from the amalgam process is employed.

There was therefore the problem of finding a dissolving process which avoids emissions of mercury and has the advantages of the open salt store, but avoids the formation of brine vapors. This process should also make it possible to remove, without difficulties, the insoluble gangue residue which gradually accumulates. The present invention solves this problem.

A process has now been found for producing, without vapor, concentrated aqueous sodium chloride crude brine, in which process rock salt is dissolved continuously in an open dissolving chamber containing a heap of rock salt, the brine unsaturated in respect of salt coming into contact with the heap of rock salt, saturating itself thereby with sodium chloride and then passing out of the dissolving chamber. The process comprises a system in which the brine unsaturated in respect of salt enters at the base of the dissolving chamber and penetrates the heap of rock salt, the saturated crude brine then passes out of the dissolving chamber through a vertical or inclined screen which to a large extent holds back suspended particles of rock salt, the liquid level of the saturated crude brine in the dissolving chamber does not reach the surface of the heap of rock salt and the side of the screen facing the interior of the dissolving chamber is completely covered with rock salt/brine mash.

For an advantageous ratio between the filter output and the volume of the salt heap, it is advantageous if the dissolving chamber used is elongate and if the screens are arranged on the longitudinal sides of the chamber.

Since very fine sodium chloride particles—depending on the speed of filtration—can pass through the screen in solid form, it is advisable, in the interests of safety, to dilute the possibly supersaturated brine by adding dilute brine, sufficiently for there to be no fear that sodium chloride will crystallize out in the event of small temperature variations. Concentrations of 305 to 310 g of sodium chloride per liter are desirable in this respect.

In the process according to the invention no additional outlay for metered addition of the salt is necessary; on the contrary, it is sufficient to recharge the store in the customary, batchwise manner, and it is, of course, possible for the free surface of the brine to make its appearance as the consumption of salt proceeds. At this point in time rock salt should be brought into the store again.

In this connection it is advantageous to subdivide the salt store into several dissolving chambers which are parallel-connected, in order to ensure a continuous supply of brine. It is thus possible, by starting up a new chamber in good time, to avoid a decrease in the concentration of the crude brine caused by exhausting the contents of a single chamber.

Since brine is no longer sprayed onto the salt store from above in the process according to the invention, considerably less formation of vapor results. Hence the temperature difference between the brine before the salt dissolving unit and the brine after the salt dissolving unit is also reduced considerably (to about 1° C.). This, of course, requires other measures for the removal of water and the waste heat, for example removing mercury from the effluents produced in and leaving the plant and/or discharging condensates which have been obtained in vacuum dechlorination or in cooling chlorine. It is appropriate to install vacuum evaporation of dilute brine upstream of the brine saturation operation.

The parallel connection of several dissolving chambers also makes it possible to remove the gangue which accumulates on the floors in the course of the operating time, without adversely affecting the supply of brine.

The point in time at which gangue is due to be discharged is indicated by the decrease in the concentration of the crude brine in the particular chamber. An individual closed circulation of brine can be provided for each dissolving chamber in order to complete the residual leaching out of the gangue. This means that the crude brine which is only incompletely saturated is not yet released into the electrolysis brine circulation, but is first pumped through the salt heap again. The brine is only introduced into the main brine circulation after it has reached the saturation concentration (if necessary by repeated passes). However, the brine which has not beeen completely brought up to strength can also be pumped straight back into the dilute brine circulation, thereby avoiding repeated recycling by pumping. This treatment of the gangue is continued until the gangue is largely or completely free from sodium chloride. The gangue is then flushed out of the chamber by continuous flushing with dilute brine and the dissolving chamber is filled with fresh rock salt.

After changes in equipment, the process according to the invention can be carried out in existing salt stores which are operated as combined brine saturators and evaporative coolers. The process according to the invention has particular economic advantages for plants in which, for reasons connected with materials, the brine circulation does not permit the addition of significant quantities of hypochlorite or chlorine, which would result in an increase in the redox potential of the brine and thus in a reduction in the emission of mercury by vaporization.

Appliances which have proved particularly suitable for carrying out the process according to the invention are those which consist of a dissolving chamber for dissolving rock salt, equipped with devices for feeding in brine which is unsaturated in respect of salt and for removing saturated crude brine, and wherein pipes for admitting unsaturated brine are installed on the floor of the dissolving chamber, the dissolving chamber has an elongate layout and at least one vertical or inclined screen which is permeable to brine, but not to solid rock salt and which demarcates a salt-free space in the dissolving chamber, is installed longitudinally in the dissolving chamber.

An appliance of this type is described in greater detail by means of FIGS. 1 to 3.

FIGS. 4 and 7 show sections of a dissolving chamber.

FIG. 5 shows a slit screen.

Figure 2:
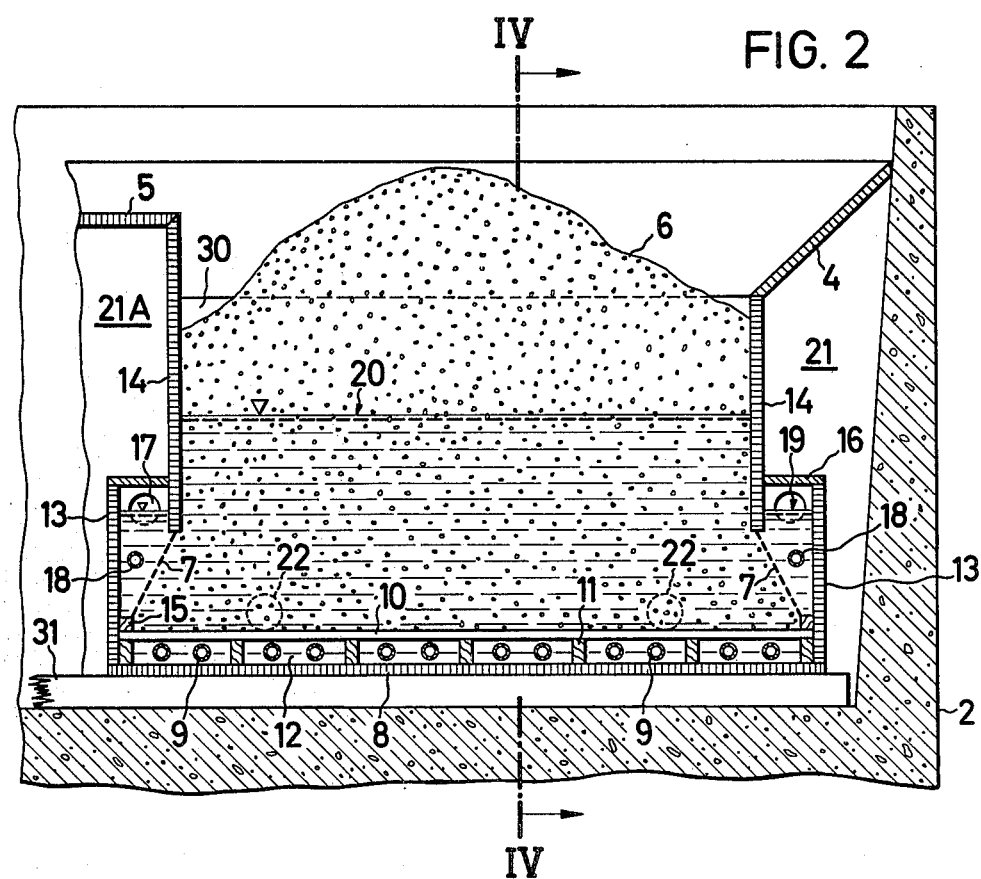

FIGS. 6A, 6B, and 6C show different arrangements of a screen.

FIG. 1 shows, in cross-section, the arrangement of several dissolving chambers (1a to 1d) in a basin (2) constructed of concrete. In the Figure (3) denotes a walkway grid, (4) denotes a filling aid which is attached (a feed hopper for rock salt), (6) denotes a heap of rock salt and (5) denotes a cover bridging two dissolving chambers. After being formed from solid salt, saturated brine is separated off through the screens (7) and withdrawn at the front faces of the dissolving chambers. The floor (8) of the dissolving chambers is preferably composed of wood. The design of the wood floor, the brine system and the wooden beams between the floor and the concrete basin, which support the base of the dissolving chambers do not appear in the drawing.

FIG. 2 shows, also in section, an individual dissolving chamber. (9) denotes feed lines for dilute brine, (10) denotes cross-beams (made of wood), forming a grid, (11) denotes wooden supports for the grid (10), placed longitudinally in the chamber, (12) denotes an interspace which is filled with brine and, in certain circumstances, coarse gravel and (31) denotes a supporting wooden beam between the floor and the concrete basin. In the case of the chamber shown, the longitudinal wall of the dissolving chamber is composed of a lower part (13) and an upper part (14). Both can be connected to a cover (16) for the crude brine which has been separated off. The screens (7) run, in the chamber shown, between the upper part (14) of the longitudinal wall and the longitudinal beam (15) on the floor of the dissolving chamber. An aperture (17) for removing the saturated crude brine ("crude brine outlet") is located at one front face of the dissolving chamber for each screen (7). (19) denotes the level of the crude brine at the height of this aperture and (20) denotes the level of the brine in the interior of the rock salt heap (6). In the interspaces (21) between the basin and the dissolving chamber or two dissolving chambers (21A), there are massive retaining walls (not shown) made of wood to absorb the lateral pressure. The aperture (22) at the front face is used to flush out the gangue after the charge in the dissolving chamber has been consumed. For the production of concentrated crude brine, the brine which is unsaturated in respect of salt enters at the base of the dissolving chamber through the pipes (9); it permeates the heap of rock salt (6) and leaves the heap of rock salt, in the form of saturated crude brine, through the screens (7), suspended particles of rock salt being largely held back. It will be appreciated that the sides of the screens (7) facing the interior of the dissolving chamber are completely covered with a mixture of saturated crude brine and rock salt and that the liquid level of the crude brine in the dissolving chamber does not reach the surface of the heap of rock salt.

Figure 3:
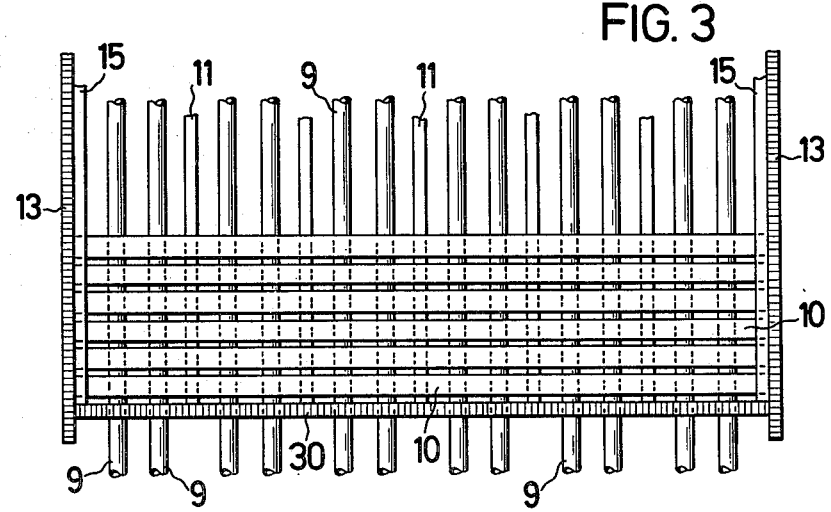

FIG. 3 shows, in plan view, a part of the dissolving chamber of FIG. 2. The floor (8) of the dissolving chamber is not shown here.

Wood is a preferred material of construction for the load-bearing units of the dissolving chambers, for example wood in the form of fir boards which have been sized with phenol-formaldehyde resin. The best protection for the interior face of the dissolving chambers against the mechanical attack of the salt heap on the wooden surface is readily replaceable wearing surfaces. Such wearing surfaces can consist, for example, of polyolefins or synthetic resins based on phenolformaldehyde or melamine. Steel alloys of material No. 1.4439 or steels of material No. 1.4441 or 1.4571 (according to German Industry Standards DIN 17007) have proved suitable as a material for metal correcting parts (for example for the connection between the upper and lower part of the longitudinal wall) and screws. The steel parts are annealed and pickled in order to avoid the stress-cracking corrosion which takes place in solutions containing chlorides.

A uniform distribution of brine over the whole surface of the chamber is very important for the satisfactory operation of the dissolving chambers. It is therefore advisable not to introduce the brine only at one single point on the floor of the dissolving chamber. A procedure which has proved particularly suitable is to provide the pipes for the admission of the unsaturated brine with several outlet apertures, arranged at regular intervals.

The supply of brine at the bottom of the heap of rock salt can also be rendered uniform by procedures which keep the pressure drop over the pipe length as low as possible; this can be achieved, for example, by feeding in brine at both ends of the pipelines (9) or by installing several pipes which are fed from one end and which only have outlet apertures at certain sections, but staggered over the whole length. The last-mentioned variant has the advantage that it enables brine to be metered in with more deliberate choice of location.

Wooden planks (11) which sub-divide the floor of the dissolving chamber into several sections separated from one another, parallel to the direction of the pipes (9), act in the same way. It is preferable for the pipes (9) and thus also the planks (11) to be arranged longitudinally in the dissolving chamber.

The outlet apertures of the pipelines (9) are preferably situated on the underside of the pipes. It is advantageous to cover the pipes (9) for admitting the unsaturated brine, and also the planks (11), by a grid placed above them, so that the pipes are not damaged by the heap of rock salt and the dilute brine which emerges is distributed more efficiently. This grid should consist of beams (10) placed side by side, with interspaces for the passage of the unsaturated brine. The beams (10) of the grid must be arranged perpendicularly to the direction of the pipes (9), in general, therefore, transversely to the dissolving chamber. It is preferable to make the interspaces between 2 beams (10) smaller than the width of the beams themselves.

The pipelines (9) can be made of customary materials which are resistant to brine, such as, for example, polyolefins, glass fiber-reinforced synthetic resins, titanium or rubber-coated steel.

In order to effect the mechanical fixing of the pipes (9), to support the beams (10) and to effect uniform distribution of the brine flow, it is advantageous to lay the pipes in a bed composed of a coarsely granular solid which is resistant to brine. An example of a solid which can be employed is coarsely granular coke, or preferably gravel. It is advisable for the particle size of the solid to be larger than the interspace between two beams (10). The distance between two beams is virtually independent of the particle size of the rock salt used and is generally 1 to 3 cm. These measures make it possible to impart to the floor of the dissolving chamber a degree of mechanical durability which, if necessary, also makes emptying by grabs possible.

It is preferable to install a line (18) for the introduction of dilute brine in the salt-free space bounded by the screen (7) and the longitudinal wall (13). This line preferably extends over the whole longitudinal face of the dissolving chamber (the same also applies to the screen). The reason for admitting dilute brine through this line (18) is not only to adjust the brine concentration desired, but also to carry along, or subsequently to dissolve, finely-divided particles of solid, consisting of gangue and/or salt. Both the precipitation of finely-divided gangue, which can take place after passing through the screen because of the low flow speeds, and the crystallizing out of saturated brine, for example as a result of cooling, are prevented in this way. The preferred brine concentration in the electrolysis process is 305 to 310 g of sodium chloride per liter.

In order to prevent the deposition of finely-divided gangue, it is advantageous to allow the dilute brine to emerge at a higher flow speed from the line (18) through apertures on the underside of the line. The line (18) can be supplied with dilute brine, for example, from both front faces. If it is supplied from only one front face, care must be taken that the pressure drop over the whole length of the pipe is approximately uniform and also that the end of the pipeline which is opposite the crude brine outlet is still adequately supplied with dilute brine. It is preferable to incline the floor of the dissolving chamber at an angle of at least 2° to the horizontal in the longitudinal direction.

FIG. 4 shows a dissolving chamber in longitudinal section. The section plane is marked "IV" in FIG. 2. The section plane marked "II" is the plane of the paper in FIG. 2. (30) denotes the front walls of the chamber and (31) denotes wooden supports for the floor (8). In the figure, the height of the supports (31) increases uniformly. It would, of course, be possible for the basin (2) already to be inclined to the horizontal and for the supports (31) to have a constant height. The crude brine leaves the dissolving chamber through the line (17) on the left-hand front wall.

The specific dissolving capacity of a dissolving chamber is defined by the ratio of crude brine flow ($m^3$/hour) to chamber surface ($m^2$). It increases as the floor area of the chamber decreases (for a constant screen area). However, a desired reduction of the floor area is opposed by economic factors, since, as the width of an individual chamber decreases and as the number of chambers increases (maintaining a constant floor area), the constructional expense of building the walls of the dissolving chambers and their static support grows at an increasing rate. It is preferable if the dissolving chamber has a rectangular layout. It is also preferable if the ratio of length to width is greater than 2:1. An economic compromise corresponds to a ratio of length to width of 2:1 to 5:1, particularly 2.9:1 to 2.3:1.

The free screen area (in general, both longitudinal faces of a chamber will be provided with screens) cannot be increased as desired either.

The ratio of free screen area to chamber floor area should indeed be as high as possible, in order to achieve a high specific dissolving capacity. However, a high ratio also leads to increased capital costs. For this reason, ratios of 1:4 to 1:8 will, in practice, be accepted. If the screens are as long as the dissolving chamber, this ratio can also be represented by the expression $H_s.a.n:B_k$, wherein $H_s$ denotes the height of a screen, a denotes the ratio of free screen area to geometrical screen area, n denotes the number of screens per chamber and $B_k$ denotes the width of a dissolving chamber.

The height of the screens is limited primarily by their mechanical strength, so that at present screen heights of 1.5 m are advantageous. In particular, intermittent pressure stresses when filling the chambers with salt require a mechanical strength which can hardly be combined with the high filter output of the screens available nowadays (a ratio of free screen area to geometrical screen area of about 50%). A further increase in the screen height is, therefore, obtained above all at the cost of the high proportion of free screen area desired, and it hardly increases the specific filter output any further.

The height of the chambers can also affect the brine throughput. This is because an increasing level of liquid produces an increased hydrostatic pressure and thus a certain increase in the brine throughput. To this extent a high ratio of chamber height to chamber width would be advantageous. In general, however, values from 0.2:1 to 0.5:1, particularly 0.25:1 to 0.4:1, are sufficient for this ratio. Considerably higher values lead to an uneconomically high constructional expense for reinforcing the chamber walls. Considerably lower values for this ratio restrict too much the opportunities for varying the level of the brine in the chamber. In most cases chambers are used having a width of 4 to 8 m.

It is preferable to construct the screens on the longitudinal face of the dissolving chamber in the form of split screens. The profile rods of which the split screen is composed should be arranged vertically in the installed state. To increase their mechanical stability, the screens can be constructed as a framework and can be supported at the chamber walls by vertical metal sheets. Furthermore, it is advantageous if the profile rods of the split screen are additionally supported by transverse struts.

What is desired to prevent the passage of the salt crystals is as high as possible a free screen area and a sufficiently narrow gap width. For example, for rock salt having the following distribution spectrum:

above 3 mm: 13–18% by weight
2–3 mm: 16–22% by weight
1–2 mm: 23% by weight
0.5–1 mm: 18–22% by weight
0.25–0.5 mm: 9–13% by weight
0.125–0.5 mm: 4–8% by weight
below 0.25 mm: 0–4% by weight gap widths of 1 to 2.2 mm, preferably 1.6 to 2.0 mm, are suitable. At a gap width of 2 mm and a profile rod width of 1.6 mm (or 2.5 mm), the free screen area is then 55% (or 44% respectively), of the geometrical screen area. For a high specific dissolving capacity, it is desirable if the width of the profile rods of the split screen and their separation are so chosen that the ratio of free screen area to geometrical screen area is at least 0.25:1, or preferably, however, at least 0.4:1. A ratio of 0.45:1 to 0.55:1 is particularly preferred.

It is advantageous if the profile rods of a split screen have an elongate cross-section and if at least one narrow face is flat, and perpendicular to the longitudinal axis of the cross-section. Choosing this shape has the effect of enabling the individual profile rods to withstand the mechanical pressure of the salt slurry better and of reducing considerably the risk of the screen area becoming clogged by gangue particles or crystals of rock salt. It is also advantageous if the flat narrow faces of the profile rods of a split screen lie in a plane which constitutes the effective screen area. This plane should then face the interior of the dissolving chamber when the screen is in operation. The risk of the split screen becoming clogged can be further reduced if the profile rods taper on the face which is turned away from the interior of the dissolving chamber.

FIG. 5 shows a section through a split screen. In the Figure, (32) denotes profile rods having a flat front surface and a tapering profile and (33) denotes profile crossbars. The arrows indicate the direction of flow of the brine.

The same materials can be used for the screens as are used for the metal tie bolts and screws of the wooden structure; it is, of course, possible to employ varieties of non-stainless steel provided with cathodic protection. An example of a suitable sacrificial anode is normal carbon steel.

In operating the appliance according to the invention, care should be taken that the crude brine side (the external side) of the screens is covered by crude brine over its entire height, since otherwise the area of free passage will be considerably reduced after a short period of operation as a result of salt crystallizing out on the screen surface which is allowed to dry. An adequate height of the crude brine level is ensured by an appropriate distance of the crude brine outflow apertures (19) from the floor or by one of the known measures for maintaining this level.

A few possible arrangements of a screen are evident from FIG. 6. A screen (7) can be fastened by its upper edge to a lug (34), of the longitudinal wall (13A), which projects into the interior of the dissolving chamber. The lower edge of the screen can be fastened to the longitudinal wall (shown in FIG. 6A) or to the floor grid (10) or to the edge of the floor grid and the longitudinal wall. It is preferable to design the longitudinal wall of the dissolving chamber so that it comprises an upper part (14) and a lower part (13), the upper edge of the screen being fastened to the lower edge of the upper part of the longitudinal wall, and the lower part of the longitudinal wall being arranged so that it is displaced sidways towards the outside, relative to the upper part (shown in FIGS. 6B and 6C). This division also permits an inclined arrangement of the screens.

The screen can also be fastened to the lower part of the longitudinal wall (13) or directly to the floor grid (10) (shown in FIG. 6B). In this case the section of (10) situated between the screen (7) and the lower part of the longitudinal wall should not be constructed in the form of a grid and should not permit the passage of dilute brine. It is preferable to fasten the screen to the edge formed by (13) and (10) (shown in FIG. 6C).

In order to be able to achieve large screen widths, it is advantageous if the lower part (13) of the longitudinal wall rises above the lower edge of the upper part (14). In order to increase the screen area for a given construction height and to prevent the screen being damaged mechanically by a heap of rock salt lying on it, it is advantageous if the screen is inclined diagonally inwards, that is to say there is an acute angle between the screen and the floor surface in the interior of the dissolving chamber.

Figure 7:
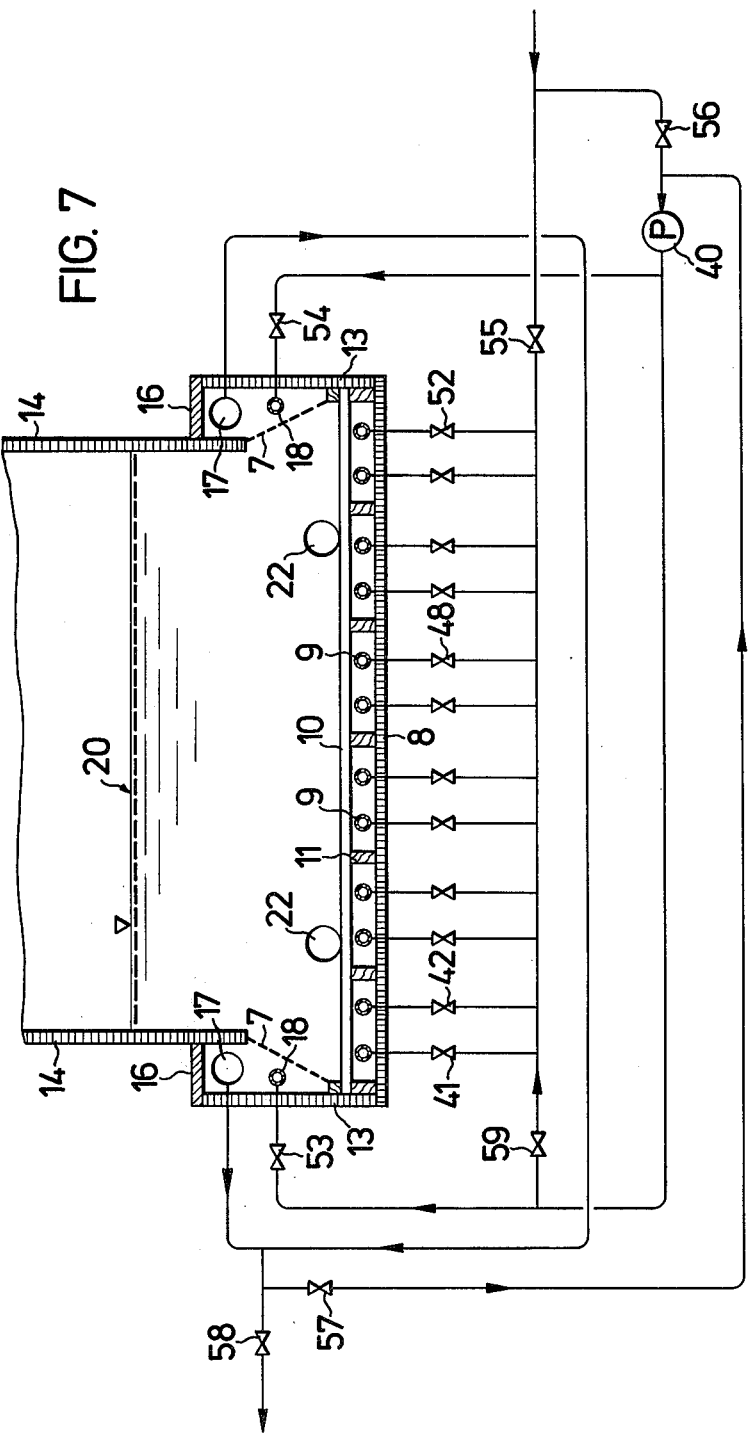

The arrangement of dilute brine lines and crude brine lines in the dissolving and secondary dissolving operation before discharging gangue is shown diagrammatically in FIG. 7 by means of a dissolving chamber which has 12 inlets for dilute brine on the floor.

In the normal operation of dissolving salt, valves 57 and 59 are closed while valves 53 to 56 and 58 are opened. The valves in the group comprising 41 to 52 are opened as necessary.

If the residual salt is to be dissolved out of the gangue to be discharged, valves 55, 56 and 58 are shut and valves 57 and 59 are opened. The incompletely concentrated brine is then fed again to the floor of the dissolving chamber via valve 57, the pump 40 and the valve 59. When the salt has been dissolved out completely, the gangue is flushed out through the apertures 22.

The invention is illustrated by means of the following examples:

EXAMPLE 1

An uninterrupted dissolving operation was maintained for 32 days in a dissolving chamber having a floor area of 16.62×7.22 m, at an inclination of 3° in the longitudinal direction and a vertical wall height of 2.36 m. A split screen with a screen height $H_s$ of 1.17 m and a free screen cross-section of 51.6% was used. The gap width of the screen was 1.6 mm.

The rock salt employed had the following average particle size distribution:

>3 mm: 17.7% by weight
2-3 mm: 21.2% by weight
1-2 mm: 24.0% by weight
0.5-1 mm: 19.7% by weight
0.25-0.5 mm: 9.8% by weight
0.125-0.25 mm: 5.6% by weight
<0.125 mm: 2.1% by weight After being initially filled with approximately 350 t of rock salt, dilute brine was passed into the chamber. After 5 hours the crude brine flowing out reached a concentration of 306 g/l. The salt charge was supplemented regularly at intervals of 10 to 14 hours. The following average operating data were obtained over the whole period for which the test was run:

Dilute brine temperature: 69.7° C.
Dilute brine concentration: 273.9 g of NaCl/l
Crude brine temperature: 67.8° C.
Crude brine concentration: 309.4 g of NaCl/l
Brine throughput: 255 m³/hour This corresponds to a dissolving capacity of 9 t of NaCl/hour. The crude brine was visually clear and free from solids. After 32 days the addition of further salt was stopped. The crude brine concentration then fell to less than 300 g of NaCl/l after aproximately 16 hours. The crude brine flowing out was then recycled into the chamber through a booster pump and was circulated, and this circulation was continued until the concentration again reached 307 to 310 g/l of sodium chloride. The brine was then removed via the slide valve 22 and was replaced by fresh dilute brine. After changing the brine nine times, the gangue, which had formed a deposit up to approximately 50 cm high on the floor, was flushed out through the open slide valve 22 by repeatedly feeding in dilute brine through the valves 41 to 52.

EXAMPLE 2

The equipment in Example 1 was operated for 8 days at the maximum possible brine throughput. The average rate measured was 295 m³/hour of crude brine containing 308.4 g of NaCl/l. The dissolving capacity was thus 11 t of NaCl/hour. On average, the resulting crude brine was 1.1° C. colder than the dilute brine employed.

I claim:

1. A process for the vapor-free production of concentrated aqueous sodium chloride crude brine comprising the steps of
    introducing unsaturated crude brine into the base of a rock salt mound in an open dissolving chamber to form a saturated brine containing suspended rock salt particles;
    maintaining the level of the saturated crude brine in the dissolving chamber below the top of the rock salt mound and above a vertical or inclined separation screen in the chamber; and
    removing suspended rock salt particles from the saturated brine by withdrawing the saturated brine from the dissolving chamber through the separation screen.

2. The process defined in claim 1 wherein the saturated brine is diluted with unsaturated crude brine to a concentration of 305 to 310 g/l of sodium chloride after the saturated brine has passed through the separation screen.

3. The process defined in claim 1 wherein the saturated crude brine is withdrawn through the separation screen at a rate to maintain the level of saturated brine within the chamber at a level above the separation screen.

* * * * *